United States Patent
Bui Tran et al.

(10) Patent No.: US 10,905,288 B2
(45) Date of Patent: Feb. 2, 2021

(54) APPARATUS FOR PRODUCING A FOOD ITEM

(71) Applicant: BSH HAUSGERAETE GMBH, Munich (DE)

(72) Inventors: Duc Hanh Bui Tran, Munich (DE); Erik Kordt, Munich (DE); Lucia Schuster, Stuttgart (DE)

(73) Assignee: BSH Hausgeraete GmbH, Munich (DE)

( * ) Notice: Subject to any disclaimer, the term of this patent is extended or adjusted under 35 U.S.C. 154(b) by 242 days.

(21) Appl. No.: 16/071,942

(22) PCT Filed: Jan. 11, 2017

(86) PCT No.: PCT/EP2017/050484
§ 371 (c)(1),
(2) Date: Jul. 23, 2018

(87) PCT Pub. No.: WO2017/125296
PCT Pub. Date: Jul. 27, 2017

(65) Prior Publication Data
US 2019/0038080 A1  Feb. 7, 2019

(30) Foreign Application Priority Data
Jan. 22, 2016 (DE) .................. 10 2016 200 872

(51) Int. Cl.
*A47J 44/00* (2006.01)
*A47J 37/00* (2006.01)
(Continued)

(52) U.S. Cl.
CPC ............... *A47J 44/00* (2013.01); *A47J 27/12* (2013.01); *A47J 37/00* (2013.01); *A47J 27/14* (2013.01)

(58) Field of Classification Search
CPC .. A47J 27/12; A47J 27/14; A47J 37/00; A47J 44/00
(Continued)

(56) References Cited

U.S. PATENT DOCUMENTS 3,177,616 A * 4/1965 Sawyer .................. A01G 9/029
47/61
6,442,893 B1 * 9/2002 Lai ......................... A01G 31/02
47/14
(Continued)

FOREIGN PATENT DOCUMENTS

WO   2014190217 A1   11/2014

*Primary Examiner* — Reginald Alexander
(74) *Attorney, Agent, or Firm* — Laurence A. Greenberg; Werner H. Stemer; Ralph E. Locher

(57) ABSTRACT

An apparatus for producing a food item contains a cultivation component for cultivating and preparing an edible cultivated ingredient, and a device for preparing an edible external ingredient, which is not cultivated in the apparatus. The apparatus also has processing devices, which are intended to produce a food item from at least one cultivated ingredient and at least one external ingredient. The apparatus further has a control unit, which is intended to determine a recipe for producing a first food item. The recipe indicates ingredients and process steps for producing the first food item. The control unit is also intended to cause the processing devices to produce the first food item in accordance with the recipe.

15 Claims, 1 Drawing Sheet

(51) Int. Cl.
*A47J 27/12* (2006.01)
*A47J 27/14* (2006.01)

(58) Field of Classification Search
USPC .............. 99/357, 325, 339, 484; 47/59 R, 14
See application file for complete search history.

(56) References Cited

U.S. PATENT DOCUMENTS

| | | | |
|---|---|---|---|
| 7,971,390 B2 * | 7/2011 | McKenna | A01G 27/003 47/59 R |
| 2013/0101714 A1 | 4/2013 | Buehler | |
| 2015/0290795 A1 | 10/2015 | Oleynik | |
| 2015/0342133 A1 * | 12/2015 | Nakajima | A01G 31/06 47/62 R |

* cited by examiner

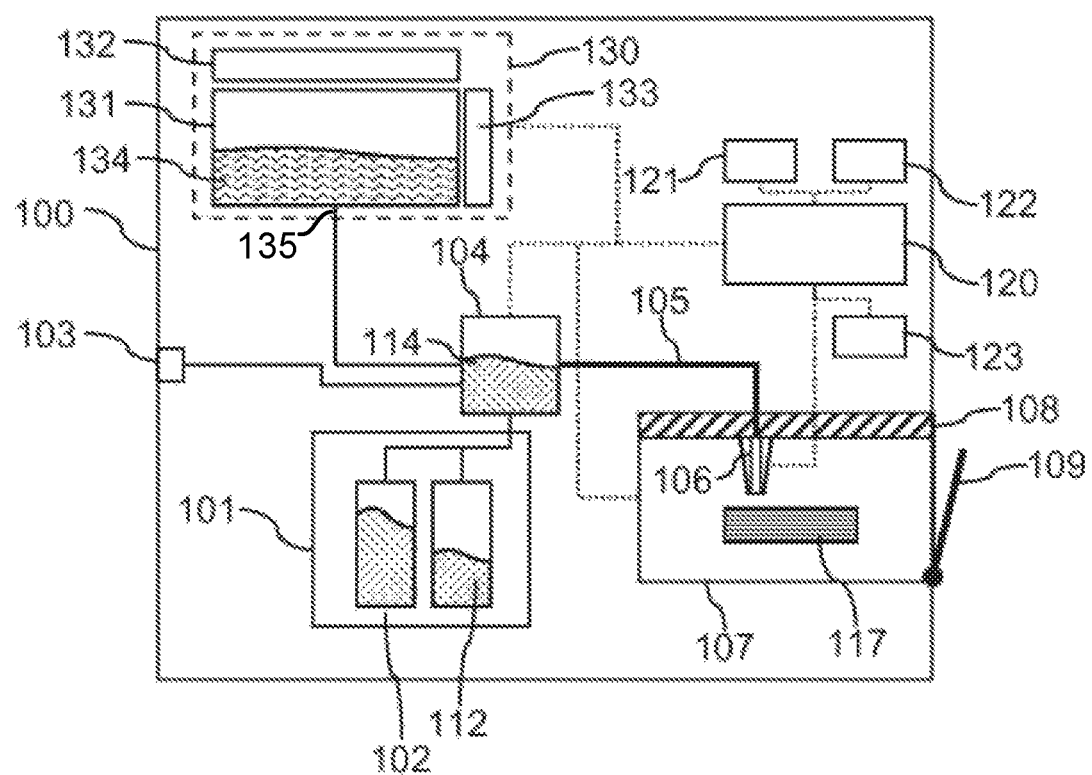

APPARATUS FOR PRODUCING A FOOD ITEM

BACKGROUND OF THE INVENTION

Field of the Invention

The invention relates to an appliance for automatically producing a food item.

Consumers have increasing requirements with respect to the quality of the food items which they consume. There is also an increasing desire to be able to tailor food items to personal requirements or needs in a simple and reliable manner. The present document deals with the technical object of providing an appliance that allows a user to produce high-quality personalized food items.

SUMMARY OF THE INVENTION

The object is achieved by the subject matter of the independent claim. Advantageous and optional embodiments are in particular defined in the dependent claims, described in the description that follows or illustrated in the accompanying drawing.

According to one aspect of the invention an appliance for producing a food item (e.g. a cooked food item) is described. The appliance can be a domestic or household appliance, in particular for a domestic kitchen.

The appliance comprises a cultivation component for cultivating and providing an edible cultivated ingredient. In other words an edible ingredient can be grown or cultivated in the cultivation component of the appliance. Examples of ingredients cultivated in the appliance are a vegetable, a sprout, khai-nam (botanical name Wolffia arrhizal, rootless duckweed) and/or a fruit. The one or more ingredients cultivated in the appliance can optionally represent the main component of a food item produced using the appliance. In particular a food item produced by the appliance can be more than 50%, in particular more than 80%, made up of one or more cultivated ingredients cultivated in the appliance.

The appliance also comprises means for providing an edible external ingredient which is not cultivated in the appliance. Examples of external ingredients include in particular additives such as colorings, spices, sweeteners, vitamins, minerals, fats, oils, texturizing agents and/or thickeners. Alternatively or additionally the external ingredients can comprise non-vegetable ingredients (e.g. meat). The external ingredient can have a solid (optionally moldable) state. In particular the external ingredient can be other than pure water.

The appliance also comprises processing means, which are designed to produce a food item from at least one cultivated ingredient and at least one external ingredient. In particular in this process at least one cultivated ingredient and at least one external ingredient can be measured out and combined and optionally provided in the form of a moldable and/or viscous compressed mass.

The appliance also comprises a control unit, which is designed to determine a recipe for producing a first food item, the recipe indicating (cultivated and/or external) ingredients and process steps for producing the first food item. The control unit is also designed to prompt the processing means to produce the first food item from at least one cultivated ingredient and optionally at least one external ingredient according to the recipe.

The appliance therefore allows the entire production process for a food item to be monitored (from cultivation to cooking process). This allows the quality of a food item to be reliably guaranteed. Also the individual processing of the ingredients for producing the food item allows efficient individualization of food items.

The cultivation component typically comprises a cultivation region, in which the cultivated ingredient can grow. Cultivation here can take place for example in or on a solid or liquid medium (e.g. in a fertile substrate or liquid). The cultivation component can also comprise a light source (e.g. an LED-based light source), which is designed to provide light for photosynthesis of the cultivated ingredient in the cultivation region. Alternatively or additionally the cultivation component can comprise a climate unit, which is designed to set (e.g. control and/or regulate) a climate, in particular a temperature and/or gas composition (e.g. oxygen, carbon dioxide, etc.), in the cultivation region. The cultivation component can also comprise a nutrient source (e.g. for fertilizers), in order to provide nutrients for the growth of the cultivated ingredient. The cultivation process and in particular the light source, climate unit and/or nutrient source can be controlled by the control unit of the appliance. This allows the at least one cultivated ingredient to be provided in a reliable and continuous manner in the appliance.

The cultivation component can comprise a harvesting module, which is designed to remove a mature portion of the cultivated ingredient from the cultivation region. For example it can be identified by way of the size, shape and/or color which part of the cultivated ingredient in the cultivation region is mature. This part can then be removed selectively (e.g. by a filter or gripper arm) from the cultivation region. Alternatively or additionally different subregions of the cultivation region can have ingredients cultivated to differing maturity levels so the mature portion of the cultivated ingredient can be selected by selecting a defined subregion of the cultivation region.

The control unit can be designed to control the harvesting module in order to remove a quantity of the cultivated ingredient indicated in the recipe for producing the first food item from the cultivation region. Otherwise the cultivated ingredient can remain in the cultivation region and thus continue to be kept fresh. The selective harvesting of parts of an ingredient cultivated in the appliance for producing a food item further improves the quality of the food item produced.

The processing means can comprise a mixing unit, which is designed to produce an edible compressed mass from the at least one cultivated ingredient and the at least one external ingredient. The compressed mass can be output for consumption at an opening or by way of a nozzle of the appliance.

The processing means can comprise a nozzle to extrude the compressed mass. The nozzle here can be movable and can be designed to expel the compressed mass at different points (e.g. on a tray) to produce a spatial arrangement of compressed mass for a food item. For example the recipe can indicate one or more first points at which compressed mass should be arranged in the spatial arrangement of compressed mass to produce the first food item. The control unit can be designed to prompt the movable nozzle to expel the compressed mass at the one or more first points in the spatial arrangement of compressed mass. This allows complex food items to be produced automatically.

The processing means can comprise a cooking unit, which is designed to cook the compressed mass in order to produce a food item. The cooking unit can be designed in particular to bake, grill, roast, heat, dry, braise and/or boil with water.

In particular the cooking unit can be designed to apply a plurality of different cooking methods to the spatial arrangement of compressed mass. For example the spatial arrangement of compressed mass can be at least partially boiled with water and at least partially roasted. This allows the appliance to produce foods that are cooked in a complex manner. The recipe can indicate a setting for the cooking unit, in particular a cooking temperature and/or a cooking time. The control unit can be designed to control the cooking unit as a function of the recipe. This allows the food item to be cooked automatically.

The recipe can indicate the required one or more cultivated ingredients and/or the required one or more external ingredients needed to produce the first food item. The processing means can comprise measuring means for measuring out the quantity of a cultivated ingredient and/or the quantity of an external ingredient. The control unit can be designed to control the measuring means according to the recipe in order to produce the first food item. The different use of ingredients in different recipes allows different food items to be produced efficiently.

The means for providing an edible external ingredient can comprise an interface for holding a capsule, the capsule containing at least one edible external ingredient. The capsule can optionally automatically indicate a recipe for producing a food item (e.g. by way of a code on the capsule or by way of an external appearance of the capsule). The use of capsules allows reliable and repeated production of food items of identical quality.

Alternatively or additionally the means for providing an edible external ingredient can comprise a container in the appliance for holding an edible external ingredient. The appliance can optionally comprise a water connector for a user's domestic water line (for providing water as an external ingredient for a food item and/or for watering the cultivation component to produce a cultivated ingredient). Different external ingredients can be provided in a flexible manner by way of container and/or connectors to produce different food items.

The appliance can comprise a user interface, by way of which one or more parameters can be acquired for producing the first food item. A recipe can also be selected by way of the user interface. The control unit can be designed to produce the first food item as a function of the one or more acquired parameters. The acquisition of one or more parameters allows a user to tailor a food item produced to personal preferences. The cooking time or quantity of a cultivated or external ingredient for example can be tailored by way of the acquired parameters.

The control unit can be designed to determine information about a user of the appliance. Information about the user can in particular comprise information about a preference of the user, information about a nutrient requirement of the user and/or information about a nutrient recommendation for the user. Information about the user can be stored for example as a profile on a storage unit of the appliance. The control unit can be designed to prompt the processing means also to produce the first food item as a function of the information about the user.

The appliance can have a (typically closable) opening, by way of which the first food item can be passed out of the appliance. For example the appliance can have a transport mechanism, by way of which the cooked food item is conveyed out of the cooking unit. This allows convenient access to the food item produced.

It should be noted that all the aspects of the appliance described in the present document can be combined in many different ways. In particular the features of the claims can be combined in many different ways.

BRIEF DESCRIPTION OF THE DRAWING

The invention is described in more detail below with reference to exemplary embodiments described in the accompanying drawing, in which FIG. 1 shows a block diagram of an appliance for producing a food item.

DESCRIPTION OF THE INVENTION

As set out in the introduction, the present document deals with the automatic production of high-quality personalized food items. The food items here can in particular be produced individually in portions for one person or for a small group of people (for example a family of four).

FIG. 1 shows a block diagram of an exemplary appliance 100 for producing a food item 117 (e.g. for producing a complete cooked dish). The appliance 100 comprises a cultivation component 130, which is designed to cultivate at least one ingredient 134 (in particular a plant) for a food item 117. Exemplary ingredients 134 are vegetables, sprouts, fruit, khai-nam, etc. The cultivation component 130 comprises a cultivation region 131, in which the ingredient 134 can be cultivated for example on a fertile substrate and/or in a liquid. The cultivation component 130 also comprises a light source 132 (e.g. an LED-based light source) to promote photosynthesis for the growth of the cultivated ingredient 134. The cultivation component 130 also comprises a climate unit 133, which can adjust the climate (e.g. the temperature and/or gas composition in the cultivation region 131). The cultivation component 130 can be controlled by a control unit 120 of the appliance 100.

An ingredient 134 cultivated in the cultivation component 130 can be harvested by a harvesting mechanism or by a harvesting unit 135. For example when cultivated in liquid, mature fruit/plants (e.g. khai-nam "peas") can be filtered out automatically as a function of size, while immature fruit/plants remain in the cultivation region 131. The harvested ingredient 134 can then be measured out and transferred for example by way of a line into a mixing unit 104 of the appliance 100, so that a food item 117 can be produced therefrom automatically. The use of at least one cultivated ingredient 134, which has been cultivated in the appliance 100 itself, ensures the quality of the food item 117 produced therefrom.

The appliance 100 can have one or more interfaces 103 for providing one or more external ingredients 112. Alternatively or additionally the appliance 100 can have one or more containers 102 for holding a corresponding number of external ingredients 112. The one or more containers 102 can be introduced into the appliance 100 (at points provided for the purpose) and the one or more containers 102 can be changed as required. The one or more containers 102 can be arranged within the appliance 100 in a temperature control unit 101 (e.g. in a refrigerator). Controlling the temperature of a container 102 extends the life of the external ingredient 112 contained therein.

The edible, external or cultivated ingredients 112, 134 can at least partially have a moldable consistency. The edible ingredients 112, 134 can be present for example at least partially in pureed form. The ingredients 112, 134 can also comprise different components of a food item 117 to be produced. For example the external ingredients 112 in a first container 102 can comprise a meat component (e.g. mince).

At the same time plant-type ingredients, such as potatoes, vegetables, etc., can be provided by the cultivation component 130.

The one or more containers 102 and/or interfaces 103 can be connected to the mixing unit 104 by way of lines. One or more of the ingredients 112, 134 can be mixed in the mixing unit 104 to generate a compressed mass 114 for producing the food item 117. The compressed mass 114 can be conveyed by way of a line 105 to a nozzle 106, the nozzle 106 being designed to eject the compressed mass 114 at defined points, in order to create a spatial arrangement of compressed mass 114. For example layers of different compressed masses 114 can be ejected in order to create a layered spatial arrangement from the different compressed masses 114. To this end the nozzle 106 can be arranged in a movable manner on a rail 108, so that the nozzle 106 can be moved to different points and can eject compressed mass 114 at different points.

The spatial arrangement established based on the compressed mass 114 can be cooked by a cooking unit 107, in order to create a ready-cooked (e.g. boiled, baked or roasted) food item 117. The cooking unit 107 can comprise a thermal oven, a microwave oven, a steamer unit, a grill, a frying pan and/or a cookpot. In the example illustrated in FIG. 1 the spatial arrangement of compressed mass 114 is "pressed" directly through the nozzle 106 within the cooking unit 107. This is advantageous as it reduces the outlay for transportation of the spatial arrangement to the cooking unit 107.

The ready-cooked food item 117 can be output to a user by way of an output 109 of the appliance 100. In the illustrated example the cooking unit 107 comprises a flap 109, through which a user can remove the food item 117 from the cooking unit 107.

The appliance 100 comprises a control unit 120, which is designed to determine a recipe for a food item 117 to be created. For example the control unit 120 can access a recipe database on a storage unit 123 of the appliance 100 for this purpose. Alternatively or additionally the control unit 120 can access an external recipe database stored on an external server by way of a communication unit 121. The communication unit 121 can be designed to communicate with the external server by way of a wireless and/or wire-based network. Alternatively or additionally the recipe can be supplied to the control unit 120 or selected by way of a user interface 122 (for example by way of a touch-sensitive screen) of the appliance 100.

The control unit 120 is further designed to add quantities of ingredients 112, 134 defined as a function of the recipe (optionally by way of the mixing unit 104 or directly) to the spatial arrangement of compressed mass 114 or to the food item 117 to be produced. The control unit 120 is also designed to activate the cooking unit 107 of the appliance 100 as a function of the recipe to at least partially cook the spatial arrangement of compressed mass 114.

The present document therefore describes an appliance 100, which allows the entire production process for a food item 117 to be monitored, from cultivation of at least one ingredient 134 to the cooking process for the food item 117. The cultivation and optionally the fermentation, as well as the harvesting of a fresh ingredient 134 for the food item 117, take place in a cultivation component 130 of the appliance 100. The cultivated ingredient 134 can then be processed, optionally with other (external) ingredients 112, portioned and served, to provide an edible food item 117. Monitoring the entire production process allows the taste, texture, color, odor and/or nutrient content of a food item 117 in particular to be influenced. It allows personal dishes to be produced with different compositions for different people and/or profiles.

The growth of plants for providing at least one cultivated ingredient 134, such as vegetables, sprouts, khai-nam, fruit, etc., takes place in the cultivation component 130 of the appliance 100. The cultivation component 130 can comprise a light source 132, a water source, fertile substrates if required, a source for different gases such as oxygen, carbon dioxide, nitrogen and/or a fertilizer source. The cultivation component 130 can also comprise a mechanical component, which allows intervention in the eco-system of the cultivation component 130 (for example changing the location of plants in the cultivation region 131). The cultivation component 130 also comprises a harvesting module or harvesting unit 135 for removing plants 134 that are ready for consumption or for (automatically/manually) forwarding plants 134 that are ready for consumption for further processing in the appliance 100. The cultivation component 130 can also comprise a quality assurance module, for example to monitor plant health or food safety. Chemical measurements for example can be performed within the cultivation component 130 for this purpose.

As illustrated in FIG. 1, the appliance 100 can have at least one interface 103 for adding further ingredients 112 (e.g. for adding flavorings, nutrients, texturizing agents, odor-influencing foods, etc.). The interface 103 can for example allow a capsule to be held in place, the capsule containing one or more further ingredients 112 for producing a food item 117 based on the one or more cultivated ingredients 134. For example a main component can be provided as an ingredient 134 for a food item 117 by way of the cultivation component 130. Additives can then be provided by way of the external ingredients 112 (in particular by way of a capsule), allowing personalization of the food item 117. The food item 117 produced can be more than 50%, in particular more than 80%, made up of one or more ingredients 134 cultivated in the appliance 100.

As an alternative or in addition to the provision of an external ingredient 112 by way of an interface 103 for capsules, an external ingredient 112 can also be supplied by way of a container or cartridge 102 and/or by way of an opening in the appliance 100. The external and/or cultivated ingredients 112, 134 can thus be measured out manually or automatically for production of a food item 117. Measuring can take place based on a stored profile or recipe or based on a personal selection.

The appliance 100 also comprises processing means 104, 106, 107, which can be used to produce a food item 117 based on the freshly cultivated and optionally added external ingredients 112, 134. Mechanical processing of the ingredients 112, 134 (e.g. kneading, mixing, stirring, chopping, homogenizing, etc.) can take place in the processing means (in particular in the mixing unit 104). Thermal processing (e.g. steam cooking, boiling, sous-vide cooking, baking, grilling, chilling, freezing, etc.) can also take place in the processing means (in particular in the cooking unit 107). A mixture of ingredients 112, 134 can also be prepared (e.g. thickened, liquefied, etc.) so the mixture is suitable for outputting (e.g. for pressing out by way of a nozzle 106).

A compressed mass 114 can be generated in the mixing unit 104 from at least one cultivated ingredient 134 and optionally at least one external ingredient 112 and can then be extruded by way of a nozzle 106. The compressed mass 114 here can be output at a defined point by a static extrusion nozzle 106. Alternatively or additionally outputting can take place in a two-dimensional plane by an extrusion nozzle 106 that can be moved in the x-y plane (parallel to a surface or tray surface). Alternatively or additionally three-dimensional structures or arrangements of compressed mass 114 can be created (e.g. by fused deposition modeling, continuous casting, injection molding, pressing into shape, etc.). Alternatively or additionally the mixture of ingredients 112, 134 can be output directly into a container, for example as dough, powder, pulp, liquid, soup, lumps, ice mass or block.

The appliance 100 can comprise a user interface 122, a control unit 120 and/or a communication unit 121. It is thus possible to access recipes for producing a food item 117. Settings can also be determined for the automated operation of the preparation process for a food item 117. The user can also be given feedback about the appliance status, plant status and/or preparation status. The appliance 100 can also be connected to a user community by way of the communication unit 121. Different user profiles can also be created and stored on a storage unit 123. An interface can also be provided with external electronic devices (e.g. smart wearables, smartphones, tablet PCs, etc.). The control unit 120 can process the available information about a user (e.g. preferences, nutrition recommendations, movement information, vital signs, specific requirements, etc.) to tailor a food item 117 produced to the individual requirements of said user.

The appliance 100 described in the present document allows full monitoring of the food chain when preparing a food item 117. In particular with the appliance 100 a user can influence all the steps from cultivation to preparation of the main components of a food item 117. Provision of the different functional components for integrated production in a single appliance 100 saves space, simplifies the production process and reduces costs. It can also reduce the labor required to produce a food item 117 (as boiling in particular is no longer necessary). The appliance 100 can produce a food item 117 that is tailored in a personalized manner for a user (for example in respect of portion size, nutrient content, taste, odor, texture, etc.).

The present invention is not restricted to the exemplary embodiments shown. It should be noted in particular that the description and FIGURES are only intended to illustrate the principle of the proposed appliance.

The invention claimed is:

1. An appliance for producing a food item, the appliance comprising:
    a cultivation component for cultivating and providing an edible cultivated ingredient, said cultivation component having a cultivation region, in which the edible cultivated ingredient can grow, wherein cultivation takes place in or on a liquid medium, said cultivation component having a harvesting module configured to remove a mature portion of the edible cultivated ingredient from said cultivation region by filtering out mature fruits or plants in dependence on size;
    means for providing an edible external ingredient which is not cultivated in the appliance;
    processing means configured to produce the food item from at least one said edible cultivated ingredient and at least one said edible external ingredient; and
    a control unit configured to control said harvesting module in order to remove a quantity of the edible cultivated ingredient indicated in a recipe for producing the food item from said cultivation region, said control unit configured to:
        determine the recipe for producing the food item, the recipe indicating ingredients and process steps for producing the food item; and
        prompt said processing means to produce the food item according to the recipe; and
    a quality assurance module configured to monitor plant health or food safety, said quality assurance module configured to perform chemical measurements within said cultivation component and to monitor said plant health or food safety based on said chemical measurements.

2. The appliance according to claim 1, wherein:
    said cultivation component has a light source providing light for photosynthesis of the edible cultivated ingredient in said cultivation region; and/or
    said cultivation component has a climate unit controlling and/or regulating a climate, including a temperature and/or a gas composition, in said cultivation region.

3. The appliance according to claim 1, wherein said cultivation component has a nutrient source, in order to provide nutrients for a growth of the edible cultivated ingredient.

4. The appliance according to claim 1, wherein said processing means includes a mixing unit, which is configured to produce an edible compressed mass from the at least one edible cultivated ingredient and the at least one edible external ingredient.

5. The appliance according to claim 4, wherein said processing means include a nozzle to extrude the edible compressed mass.

6. The appliance according to claim 5, wherein said nozzle is movable and configured to expel the edible compressed mass at different points to produce a spatial arrangement of the edible compressed mass for the food item.

7. The appliance according to claim 6, wherein:
    the recipe indicates at least one first point, at which the edible compressed mass should be disposed in the spatial arrangement of the edible compressed mass to produce the food item; and
    said control unit is configured to prompt said nozzle to expel the edible compressed mass at the least one first point in the spatial arrangement of the edible compressed mass.

8. The appliance according to claim 5, wherein said processing means includes a cooking unit configured to cook the edible compressed mass in order to produce the food item.

9. The appliance according to claim 1, wherein:
    the recipe indicates required cultivated ingredients and/or required external ingredients needed to produce the food item.

10. The appliance according to claim 1, wherein said means for providing the edible external ingredient has an interface for holding a capsule and said capsule contains the edible external ingredient.

11. The appliance according to claim 1, wherein said means for providing the edible external ingredient includes a container in the appliance for holding the edible external ingredient.

12. The appliance according to claim 1, wherein the edible cultivated ingredient contains khai-nam.

13. The appliance according to claim 1, wherein the food item can be more than 50% made up of the edible cultivated ingredient cultivated in the appliance.

14. The appliance according to claim 1, wherein:
    said control unit determines information about a user of the appliance, the information about the user contains first information about a preference of the user, second information about a nutrient requirement of the user and/or third information about a nutrient recommendation for the user; and said control unit is configured to prompt said processing means also to produce the food item in dependence on the information about the user.

15. The appliance according to claim 1, wherein the food item can be more than 80% made up of the edible cultivated ingredient cultivated in the appliance.

\* \* \* \* \*